United States Patent
Liardet

(10) Patent No.: US 7,447,916 B2
(45) Date of Patent: Nov. 4, 2008

(54) BLOCKING OF THE OPERATION OF AN INTEGRATED CIRCUIT

(75) Inventor: Pierre-Yvan Liardet, Peynier (FR)

(73) Assignee: STMicroelectronics S.A., Montrouge (FR)

( * ) Notice: Subject to any disclaimer, the term of this patent is extended or adjusted under 35 U.S.C. 154(b) by 1008 days.

(21) Appl. No.: 10/304,364

(22) Filed: Nov. 26, 2002

(65) Prior Publication Data

US 2003/0101351 A1    May 29, 2003

(30) Foreign Application Priority Data

Nov. 28, 2001    (FR) .................................. 01 15361

(51) Int. Cl.
*G06F 11/30*    (2006.01)
(52) U.S. Cl. .................. 713/193; 713/189; 711/163; 711/164; 726/1; 726/2; 726/26
(58) Field of Classification Search .................. 726/27; 713/400
See application file for complete search history.

(56) References Cited

U.S. PATENT DOCUMENTS

| 5,249,294 | A  |   | 9/1993  | Griffin, III et al. |
|-----------|----|---|---------|---------------------|
| 5,448,045 | A  | * | 9/1995  | Clark .......................... 235/382 |
| 5,675,645 | A  | * | 10/1997 | Schwartz et al. ............ 713/187 |
| 5,944,833 | A  |   | 8/1999  | Ugon |
| 6,311,273 | B1 | * | 10/2001 | Helbig et al. ................... 726/2 |
| 2002/0166067 | A1 | * | 11/2002 | Pritchard et al. ............ 713/201 |

OTHER PUBLICATIONS

French Search Report from French Patent Application No. 01/15361, filed Nov. 28, 2001.

* cited by examiner

*Primary Examiner*—Kambiz Zand
*Assistant Examiner*—Roderick Tolentino
(74) *Attorney, Agent, or Firm*—Lisa K. Jorgenson; William R. McClellan; Wolf, Greenfield & Sacks, P.C.

(57) ABSTRACT

A method and a system for blocking an integrated circuit after detection of an attempt of unauthorized access to information that it contains, in which a first program of generation of a second program to be executed in a random access memory of the integrated circuit is executed, the second program including several instruction sequences and each sequence ending with a branching to another sequence; and the second program is executed.

21 Claims, 1 Drawing Sheet

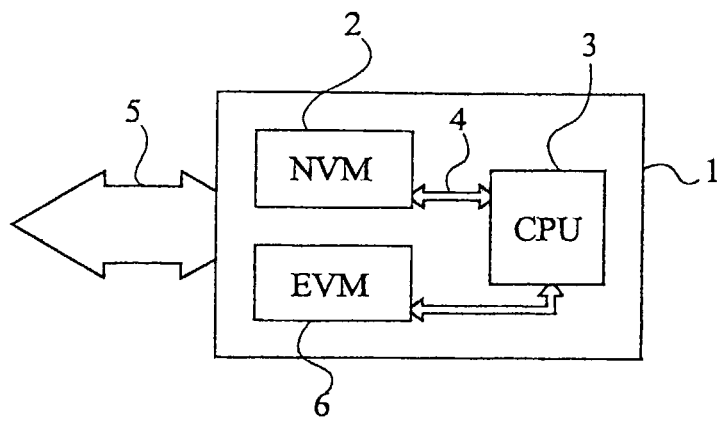
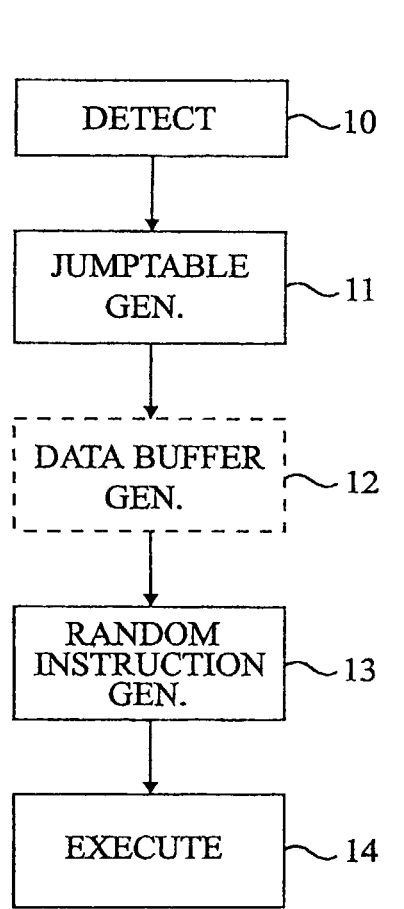
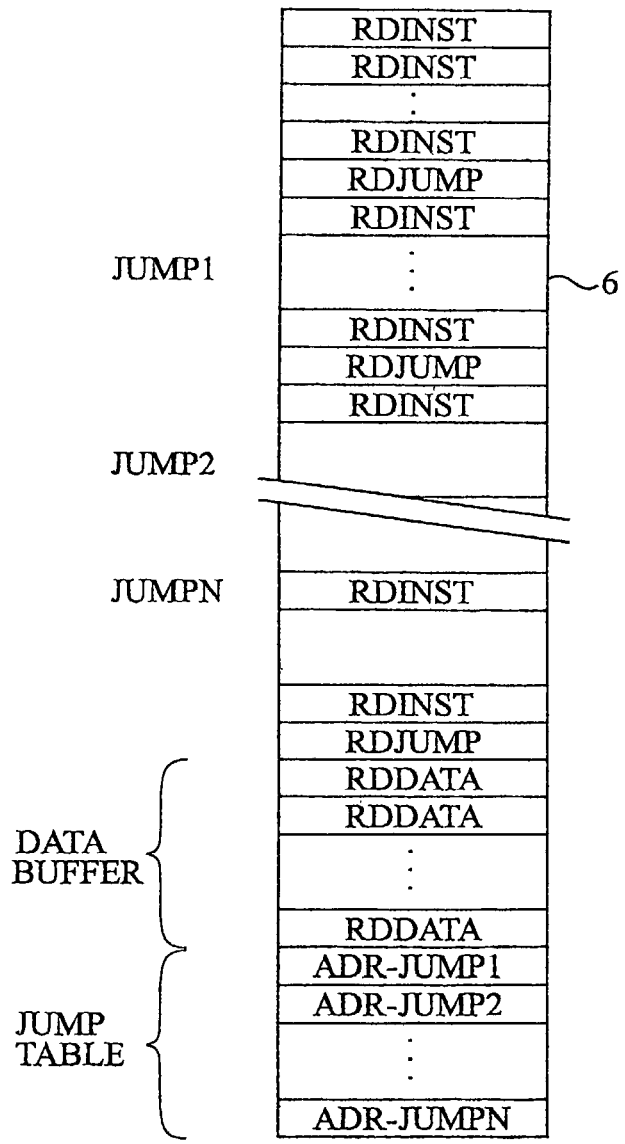
Fig 1
Fig 2
Fig 3

BLOCKING OF THE OPERATION OF AN INTEGRATED CIRCUIT

BACKGROUND OF THE INVENTION

1. Field of the Invention

The present invention relates to the security of integrated circuits against possible acts of piracy and, more specifically, the blocking of the normal operation of an integrated circuit in case of an attempt of violation of its memory.

2. Discussion of the Related Art

An example of application of the present invention relates to smart cards in which one or several integrated circuit chips execute functions which are desired to be kept secret and/or use secret data.

In this type of application, and more generally in any application using an integrated circuit implementing an algorithm and/or secret data, integrated circuits are often submitted to piracy attempts from dishonest users aiming at penetrating their secret. In the case of the execution of programs, the data coding or encryption algorithms are generally attempted to be determined. In the case of a key or a secret quantity contained in the integrated circuit, the corresponding datum is desired to be determined.

Attempts of piracy against secret quantities of integrated circuits are generally called "attacks". Two types of attacks are generally known. A first attack consists of analyzing the power consumption of the integrated circuit during the execution of an algorithm by the circuit. The attack may be by simple power analysis (SPA) or differential power analysis (DPA) of the power consumption. Such an attack consists of evaluating the direct or statistical dependence between the circuit power consumption and the use of digital data processed by a chip of this circuit and involving a secret quantity. Indeed, in an algorithmic processing by means of a processing circuit, there is a dependence between the circuit power consumption and the processed datum. The pirate uses the data introduced in the circuit, and thus "visible", and used by the algorithm, to determine the secret datum embedded in the circuit.

A second category of attacks relates to differential fault analysis (DFA) attacks. Such attacks consist of causing faults or errors in the progress of an algorithm processed by the integrated circuit to extract the secret information therefrom.

Smart cards, or more generally integrated circuits with secret data, may be equipped with functions of detection of a fraud attempt or more generally of detection of incorrect parameters, leading to the suspicion of a fraud attempt.

Most often, it is then desired to block the component by the execution of an instruction in endless loop. Such an infinite loop operation is preferred to a plain stopping of the component, since it enables not giving back the lead to the user and thus makes the analysis by a pirate more difficult.

A disadvantage of the operation in infinite loop on an instruction is that this gives an indication to the pirate of the fact that he has blocked the program executed by the integrated circuit. In particular, in a power consumption analysis, it is possible to detect an instruction executed in a loop. The pirate then knows that he has touched a sensitive area of the component by his action. He can then intervene on the instruction counter to force a coming out of the loop, which makes the component particularly fragile.

SUMMARY OF THE INVENTION

The present invention aims at overcoming the disadvantages of conventional actions implemented in an integrated circuit after a detection of a fraud attempt or the like.

The present invention more specifically aims at providing a solution which prevents the possible pirate from finding out that the component has reacted to the detection of his intervention.

The present invention also aims at providing a solution which is not reproducible, that is, which translates as a different behavior of the integrated circuit upon each fraud attempt.

To achieve these objects as well as others, the present invention provides a method for blocking an integrated circuit after a detection of an attempt of unauthorized access to information that it contains, including the steps of:

executing a first program of generation of a second program to be executed in a random access memory of the integrated circuit, said second program including several instruction sequences and each sequence ending with a branching to another sequence; and executing the second program.

According to an embodiment of the present invention, a jump address table is generated in the RAM, the jump addresses being distinct two by two by a predetermined number of addresses;

an instruction for branching on one of the addresses of the jump table is placed at the address preceding a jump address; and the intermediary addresses are filled with instructions randomly chosen from a set of predetermined instructions.

According to an embodiment of the present invention, the jump table is randomly filled upon each generation of the second program.

According to an embodiment of the present invention, the set of predetermined instructions contains no instruction of branching to a sensitive area of the integrated circuit.

According to an embodiment of the present invention, the set of predetermined instructions contains no instruction of access to the ROM of the integrated circuit and/or no jump or stop instruction.

According to an embodiment of the present invention, the branching instructions of the second program select by random drawing an address from the jump table.

According to an embodiment of the present invention, a buffer is used to store data to be processed by the random instructions.

The present invention also provides an integrated circuit provided with at least one non-volatile memory and with one executable volatile memory, and with means for implementing the blocking method.

The foregoing objects, features and advantages of the present invention will be discussed in detail in the following non-limiting description of specific embodiments in connection with the accompanying drawings.

BRIEF DESCRIPTION OF THE DRAWINGS

FIG. 1 very schematically shows an integrated circuit usable to implement the present invention;

FIG. 2 shows an example of architecture of the non-volatile memory of an integrated circuit according to the present invention; and FIG. 3 illustrates, in the form of a timing diagram, an embodiment of the integrated circuit blocking method according to the present invention.

DETAILED DESCRIPTION

For clarity, only those circuit elements and those steps of the method which are necessary to the understanding of the present invention have been shown in the drawings and will be described hereafter. In particular, not all components of the integrated circuit have been detailed in FIG. 1.

A feature of the present invention is to provide the generation of a random program code each time a component requires blocking due to a detection of an attempt of violation thereof.

FIG. 1 partially and very schematically shows an example of an integrated circuit 1 of the type to which the present invention may apply. To implement the present invention, integrated circuit 1 includes a non-volatile memory 2 (NVM) formed, for example, by a ROM, PROM, EEPROM, or the like. Circuit 1 also includes a central processing unit 3 (CPU) communicating with memory 2 over a bus 4. Circuit 1 communicates with the outside by means of one or several buses 5. In FIG. 1, a single multiple-wire connection has been shown. It should be however noted that this means that all control, detection, and processing signals transit over these wires. The components described hereabove are those conventionally equipping any smart card.

To implement the present invention, integrated circuit I further includes an executable volatile memory 6 (EVM). It is, for example, an executable RAM. This condition is needed for the program generated to block the component to be able to execute without using non-volatile memory 2. This functionality is linked to the random generation of the blocking program.

The rest of the circuit components have not been detailed. It includes all the conventional components linked to the application of this circuit.

FIG. 2 shows, in a very simplified timing diagram, an embodiment of a method for blocking a component according to the present invention.

FIG. 3 illustrates the implementation of this method, by an example of the content of executable RAM 6 after the writing, in this memory, of instructions of the blocking program according to the present invention.

The method initializes with a detection (block 10, DETECT) of an attempt of violation of the component, or more generally of an abnormal operation thereof considered as having to lead to its blocking. This detection is conventional.

Next step 11 (JUMP TABLE GEN) includes generating a table of the jumps or branchings (JUMP TABLE, FIG. 3) containing available addresses of the RAM. The corresponding program is contained in the non-volatile memory and generates addresses ADR-JUMPi (ADR-JUMP1, ADR-JUMP2, ..., ADR-JUMPN) of jumps chosen from the rest of the RAM. In practice, the entire memory is available except for a few special registers according to the smart card application and the addresses containing the jump table and the possible work buffer which will be described hereafter.

The parameters necessary to the generation of the jump table are number N of jumps to be generated, the range of available addresses for these jumps in the executable RAM and, if necessary, the minimum distance (in number of addresses) between two successive jumps. These parameters may be themselves randomly chosen upon each execution of the generation program, in a range of predefined authorized values.

The jump table (JUMP TABLE) is initialized, for example, at the end of memory 6.

At each address preceding the address of a branching corresponding to one of the recordings of the jump table, the generation program inserts a branching instruction (RD JUMP) based on one of the addresses in the jump table. Either the jump table directly includes instructions for branching on another memory address, or it contains the address value forming the parameter of the encountered branching instruction RD JUMP.

The blocking program generation program then generates (step 13, RANDOM INSTRUCTION GEN) sequences of random instructions RD INST. These instructions are randomly chosen from a list of authorized instructions, and fill the addresses left empty of memory 6.

Instructions RD INST are thus randomly chosen, avoiding a few specific instructions which would eliminate the loop operation of the blocking program. In particular, jumps, stops, write operations affecting the jump table must be avoided, as well as the accesses to ROM 2 in areas likely to contain critical elements of the algorithm or of certain data. The simplest is to forbid any instruction of access to the ROM in the random selection of the possible instructions of the blocking program.

Preferably, all free addresses of memory 6 are then filled with random instructions so that once the generation program is over, no address is free.

According to a preferred embodiment, instructions RD INST are chosen from a preestablished instruction list gathering instructions normally performed by the application program of the smart card. Such an embodiment has the advantage that the program implemented in the blocking resembles as much as possible to the normal component program.

Finally, the program which has just been stored in memory 6 is executed (step 14, EXECUTE). For example, this execution starts at the first address of the RAM in which the program has been described. As an alternative, it could be chosen to start the blocking program execution at any address including a random instruction RD INST or a jump instruction RD JUMP.

Optionally, a work buffer (DATA BUFFER) may be provided in a portion of memory 6 to contain random data (RD DATA) intended to be used by algorithms which are not critical as far as security is concerned and contained in the ROM. For example, an encryption algorithm contained in the non-volatile memory may be executed based on random data, provided that this algorithm is not one of the elements to be protected. Any non-critical function of the non-volatile memory can thus be called up, which makes the blocking program even more like the real program.

The generation of register DATA BUFFER is performed in a step 12 (DATA BUFFER GEN) which, for example, follows or comes before step 11. For this step, the parameters to be known are the number of addresses in the RAM to be assigned to the register as well as the range of possible data.

The line of the jump table on which each instruction RD JUMP points is, for example, randomly chosen from among the available lines, that is, not chosen yet for a preceding instruction RD JUMP. It is also provided, in the generation program, to check that an instruction RD JUMP does not point on the address following the immediately preceding instruction RD JUMP. This, in order to avoid a loop operation of the blocking program on a single instruction set.

An advantage of the present invention is that by randomly generating a program each time the component needs blocking, its behavior is not reproducible from one blocking to the other. A possible pirate is thus prevented from analyzing the successive blockings of the component to have access to the sensitive areas and/or the secret data.

Another advantage of the present invention is that it enables executing a blocking program which is as close as possible to the smart card application program. The disadvantages of blocking programs consisting of executing a simple instruction in an infinite loop are thus avoided.

Of course, the present invention is likely to have various alterations, modifications, and improvements which will readily occur to those skilled in the art. In particular, the practical implementation of the present invention is within the abilities of those skilled in the art based on the functional indications given hereabove. The choice of the number of jumps provided in the table of the present invention depends on the application. The higher this number, the closer the program behavior will be to a real operation. However, this number is of course limited by the size of the executable RAM.

Further, the choice of the random instructions and the use of a work buffer and of programs contained in the ROM is within the abilities of those skilled in the art according to the application.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for blocking an integrated circuit after a detection of an attempt of unauthorized access to information that it contains, including the steps of:
    executing a first program in response to detection of an attempt at unauthorized access to the integrated circuit, the first program generating a new second program of randomly chosen instructions to be executed in a random access memory of the integrated circuit, said second program including several instruction sequences and each sequence ending with a branching to another sequence; and
    executing the second program.

2. The method of claim 1, comprising generating a jump address table in the RAM, the jump addresses being distinct two by two by a predetermined number of addresses;
    placing an instruction for branching on one of the addresses of the jump table at the address preceding a jump address; and
    filling the intermediary addresses with instructions randomly chosen from a set of predetermined instructions.

3. The method of claim 2, wherein the jump table is randomly filled upon each generation of the second program.

4. The method of claim 2, wherein the set of predetermined instructions contains no instruction of branching to a sensitive area of the integrated circuit.

5. The method of claim 2, wherein the set of predetermined instructions contains no instruction of access to the ROM of the integrated circuit and/or no jump or stop instruction.

6. The method of claim 1, wherein the branching instructions of the second program select by random drawing an address from the jump table.

7. The method of claim 1, using a buffer to store data to be processed by the random instructions.

8. An integrated circuit provided with at least one non-volatile memory and with one executable volatile memory, including means for implementing the method of claim 1.

9. A method for blocking operation of an integrated circuit following an unauthorized access attempt, comprising:
    generating a new blocking program of randomly chosen instructions in a random access memory of the integrated circuit in response to detection of an unauthorized access attempt to the integrated circuit, the blocking program including two or more instruction sequences, each including a jump to another instruction sequence; and
    executing the blocking program.

10. A method as defined in claim 9, wherein generating a blocking program includes generating a jump table in the random access memory.

11. A method as defined in claim 10, wherein the jump table includes branch instructions, each including an instruction for branching to another memory address.

12. A method as defined in claim 10, wherein the jump table includes jump addresses, each including an address value that forms a parameter of a branch instruction.

13. A method as defined in claim 9, wherein generating the blocking program comprises:
    generating in the random access memory a jump table containing jump addresses;
    placing branch instructions at addresses preceding the jump addresses; and
    filling intermediate addresses with randomly selected instructions.

14. A method as defined in claim 9, wherein generating a blocking program further comprises using a data buffer in the random access memory to store data to be processed by the blocking program.

15. A method as defined in claim 13, wherein generating a jump address table comprises randomly filling the jump address table upon each generation of the blocking program.

16. Apparatus for blocking operation of an integrated circuit following an unauthorized access attempt, comprising:
    a non-volatile memory;
    a random access memory; and
    a processor coupled to the non-volatile memory and the random access memory, the processor including means for generating a new blocking program of randomly chosen instructions in the random access memory in response to detection of an unauthorized access attempt to the integrated circuit, the blocking program including two or more instruction sequences, each including a jump to another instruction sequence, and means for executing the blocking program.

17. Apparatus as defined in claim 16, wherein the means for generating a blocking program comprises means for generating a jump address table.

18. Apparatus as defined in claim 16, wherein the means for generating a blocking program comprises:
    means for generating in the random access memory a jump table containing jump addresses;
    means for placing branch instructions at addresses preceding the jump addresses; and
    means for filling intermediate addresses with randomly selected instructions.

19. Apparatus as defined in claim 16, wherein the random access memory includes a data buffer configured to store data to be processed by the blocking program.

20. Apparatus as defined in claim 16, wherein the means for generating a blocking program includes means for generating a jump table containing branch instructions, each including an instruction for branching to another memory address.

21. Apparatus as defined in claim 16, wherein the means for generating a blocking program comprises means for generating a jump table containing jump addresses, each including an address value that forms a parameter of a branch instruction.

* * * * *

UNITED STATES PATENT AND TRADEMARK OFFICE
CERTIFICATE OF CORRECTION

| | | |
|---|---|---|
| PATENT NO. | : 7,447,916 B2 | Page 1 of 1 |
| APPLICATION NO. | : 10/304364 | |
| DATED | : November 4, 2008 | |
| INVENTOR(S) | : Pierre-Yvan Liardet | |

It is certified that error appears in the above-identified patent and that said Letters Patent is hereby corrected as shown below:

Col. 3, line 21 should read:
To implement the present invention, integrated circuit 1

Signed and Sealed this

Sixteenth Day of December, 2008

JON W. DUDAS
*Director of the United States Patent and Trademark Office*